United States Patent [19]
Berndt

[11] Patent Number: 5,176,704
[45] Date of Patent: Jan. 5, 1993

[54] TEMPERATURE-RESPONSIVE PACIFIER ASSEMBLY

[75] Inventor: Dieter R. Berndt, Allenwood, N.J.

[73] Assignee: American Vista, Allenwood, N.J.

[21] Appl. No.: 760,595

[22] Filed: Sep. 16, 1991

Related U.S. Application Data

[63] Continuation of Ser. No. 214,416, Jul. 1, 1988, abandoned.

[51] Int. Cl.$^5$ ............................................. A61J 17/00
[52] U.S. Cl. ................................. 606/234; 606/236; 128/736; 374/151
[58] Field of Search ..................... 606/234, 235, 236; 374/151, 150; 128/736

[56] References Cited

U.S. PATENT DOCUMENTS

| | | | |
|---|---|---|---|
| 4,070,912 | 1/1978 | McNaughtan et al. | 128/736 X |
| 4,447,164 | 5/1984 | Berndt | 128/736 X |
| 4,511,265 | 4/1985 | Berndt | 128/736 X |

Primary Examiner—Michael H. Thaler
Attorney, Agent, or Firm—Louis E. Marn

[57] ABSTRACT

There is disclosed an improved temperature responsive orthodontically-shaped pacifier assembly having an insert member with two liquid crystal capsules or eyes making positive pressure contact with a nipple portion and wherein the liquid crystal capsules or eyes are responsive to different temperatures above about 98° F. whereby one capsule changes color representative of a low grade fever and both capsules change color representative of a high grade fever.

2 Claims, 1 Drawing Sheet

TEMPERATURE-RESPONSIVE PACIFIER ASSEMBLY

This is a continuation, of application Ser. No. 07/214,416, filed Jul. 1, 1988, now abandoned.

BACKGROUND OF THE INVENTION (1) Field of the Invention

This invention relates to a pacifier assembly, and more particularly to an improved temperature-responsive pacifier assembly.

(2) Description of the Prior Art

Oral and rectal thermometers having a temperature range of from about 92° to 106° F. have been in use for many years for sensing the temperature of the human body. The use of oral thermometers with infants is particularly troublesome due to the difficulty of keeping such a thermometer in the baby's mouth under conditions and for a time sufficient to permit the inserted portion of the thermometer to reach ambient conditions therein, and thereby produce a reasonably accurate reading of the actual temperature of the subject being temperature sensed. Consequently, for newborns, rectal thermometers are generally used which are believed to cause discomfort, and again are somewhat difficult to use, although not as difficult as the use of oral thermometers.

As infants age, with concomitant cutting of teeth, the use of an oral thermometer becomes hazardous due to the possibility of breakage as well as greater awareness by the subjects to the foreign object. Generally, the use of a thermometer is to generate data as to the existance of abnormal temperature, i.e., a temperature above 98.6° F., and not necessarily the number of °F. above normal temperature to permit the institution of a corrective protocol for the subject exhibiting an above normal temperature. The use of a thermometer for a subject is generally initiated based upon observable side effects of an abnormal temperature, e.g. skin color, respiration, etc. as distinguished from any constantly observable or recognized phenomena.

In U.S. Pat. No. 4,447,164 there is disclosed a pacifier assembly including a sperical capsule of a liquid crystal material submerged in a liquid medium, such as glycerine, in the interior chamber of the pacifier assembly. The liquid crystal material is responsible to a temperature above about 100° F. whereby the liquid crystal material changes color to visually indicate an abnormal temperature condition of a mammal, and in particular a homo sapien, utilizing such a pacifier assembly. Since the spherical capsule is essentially free flowing within the chamber, the pacifier assembly may not accurately and rapidly sense an abnormal condition depending upon the relative position of the spherical capsule within the pacifier assembly to the mammal during use; that is, the spherical capsule may tend to be point positioned proximate the guard and thus the heat transfer rate of the liquid medium might not be sufficient to cause the liquid crystal material to clear under discontinuous conditions of use.

In U.S. Pat. No. 4,511,265, as well as in U.S. Pat. No. 4,447,164, the liquid material used inside the pacifier (e.g. glycerine) was for thermal conductivity purposes. Because of a child's sucking habits, it is difficult for the devices of either of these patents to register a temperature change in less than six to eight minutes at the temperature level of about 100° F. However, an oral temperature sensor pacifier having a response time of a minute or less is desirable or imperative in order to quickly and accurately surmise the child's temperature or fever condition.

OBJECTS OF THE INVENTION

It is an object of the present invention to provide an improved pacifier assembly for sensing an above temperature of a mammal, and in particular, homo sapien.

Another object of the present invention is to provide an improved pacifier assembly for sensing an above normal temperture of a mammal permitting of more frequent temperature sensing time intervals.

A further object of the present invention is to provide an improved pacifier assembly for sensing an above normal temperature of a mammal readily and conveniently useable by the suspect mammal.

A still further object of the present invention is to provide an improved pacifier assembly for sensing an above normal temperature of a mammal essentially requiring no external intervention.

Still another object of the present invention is to provide an improved pacifier assembly for sensing an above normal temperature of a mammal exhibiting extended shelf life.

Still another object of the present invention is to provide an improved pacifier assembly exhibiting a low fever and/or high fever response.

A further object of the present invention is to provide an improved temperature-response pacifier assembly for sensing an above normal temperatue of a mammal exhibiting greater visual display of such above normal temperature condition.

SUMMARY OF THE INVENTION

These and other objects of the present invention are achieved by an improved temperature responsive orthodontically-shaped pacifier assembly, having an insert member with two liquid crystal capsules or eyes making positive pressure contact with a nipple portion and wherein the liquid crystal capsules or eyes are responsive to different temperatures above about 98.6° F. whereby one capsule changes color representative of a low grade fever and both capsules change color representative of a high grade fever.

BRIEF DESCRIPTION OF THE DRAWINGS

A better understanding of the present invention as well as other objects and advantages thereof will become apparent upon consideration of the detailed disclosure thereof, especially when taken with the accompanying drawing, wherein.

DETAILED DESCRIPTION OF THE INVENTION

Figure 1:
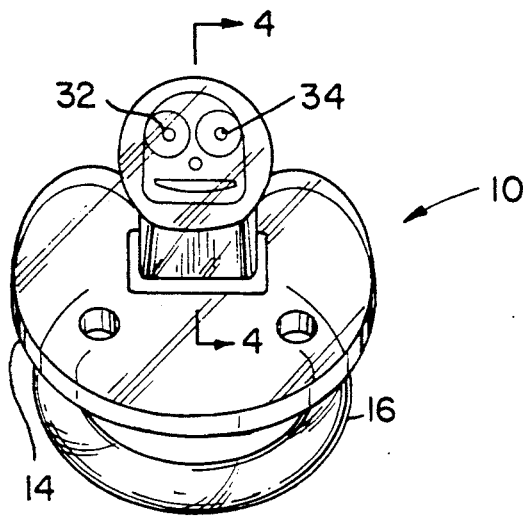
FIG. 1 is an elevational front view of the improved pacifier assembly of the present invention.
Figure 2:
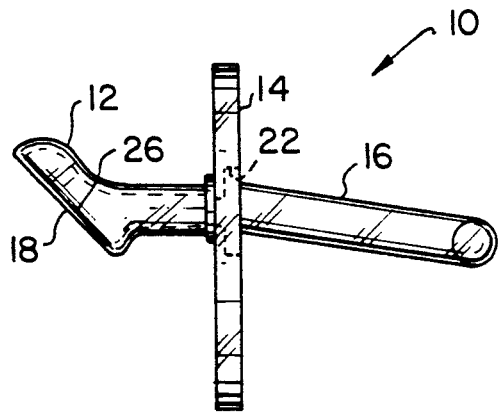
FIG. 2 is a cross-sectional view taken along the lines of 2—2 of FIG. 1.
Figure 3:
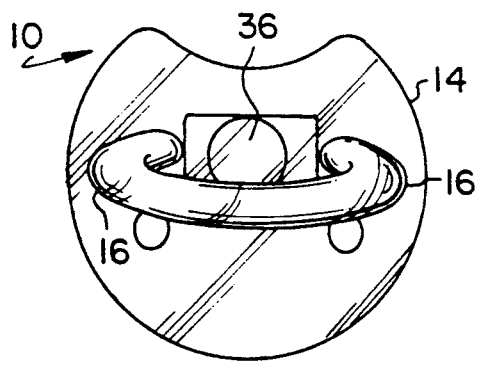
FIG. 3 is an elevational rear view of the improved pacifier assembly of the present invention.
Figure 4:
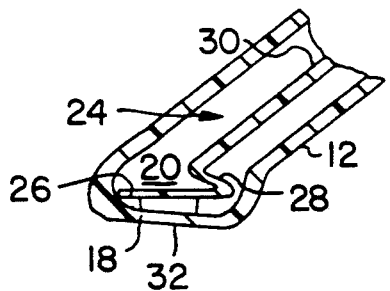
FIG. 4 is a detailed enlarged view of the nipple portion of the assembly shown in FIG. 2.

Referring now to FIGS. 1, 2, 3 and 4, there is illustrated a temperature sensing pacifier assembly, generally indicated as 10, comprised of a nipple portion 12, a guard portion 14, and a ring handle portion 16. The pacifier assembly 10 of the present invention is formed of non-toxic elastomeric material, such as a food grade plasticized polyvinyl chloride, or synthetic rubber, or the like.

The nipple portion 12 is formed with an outer end wall 18 and defines an interior chamber 20 extending to an orifice 22 in the guard portion 14 providing access to the interior chamber 20. In the chamber 20 of the nipple portion 12, there is provided an insert member, generally indicated as 24 extending longitudinally towards the end wall 18 and formed with an end portion 26, an intermediate portion 28 and an inserting end portion 30. The insert member 24 is folded about the intermediate portion 28 to bias the end portion 26 against the inner surface of end wall 18, as more fully hereinafter described. On the end portion 26 of the insert member 24, there is mounted, such as by an adhesive, capsule members 32 and 34 formed of a capsule material encapsulating a liquid crystal material, each of differing clearing temperatures.

The insert member 24 is sealed within the chamber 20 of the pacifier assembly 10 by a food grade plasticized vinyl chloride plug 36 suitably sealing the chamber 20, such as by an adhesive, ultrasonics or the like. Use of such an elastomeric material for the pacifier assembly 10 as well as the plug 36 is dictated by the desirability of durability or to substantially prevent breakage of the capsules 32 and 34 under extreme pressures and to eliminate direct shearing conditions under which the outer surface of the end wall 18 of the nipple portion 12 of the pacifier assembly 10 may be subjected against the capsules, particularly during teething of a using individual.

The capsules 32 and 34 are preferably formed of a gelatinous material, such as a glycerine/gelatin non-toxic vitamin based substance, and of a diameter of from about 0.20 to 0.23 inches. A gelatinous material is preferred over a more crystalline material, such as glass which could aid in destruction of the nipple portion 12 of the pacifier assembly 10 by a teething user.

Liquid crystals are well known to one skilled in the art. Liquid crystals materials formulations displaying a color change above 98.6° F., and preferably at a temperature above about 100° F. include a temperature of about 100° F. ± ¼° F. is preferred as being representative of a temperature through which a positive identification may be made that a feverous condition exists above the normal body temperature of 98.6° F. Additionally, such a temperature level generally represents a lowest safe-zone reading.

The capsules 32 and 34 are formed of a liquid crystal exhibiting coloring changes at different temperatures, for example capsule 32 is formulated with a liquid crystal exhibiting a color change at a temperature above about 100° F. whereas the capsule 34 is formulated with a liquid crystal exhibiting a color change above about 102° F. Thus, a change in color of capsule 32 but not of capsule 34 indicates a low grade fever, i.e. above 100° F. but below 102° F., wherein a change of color of both capsules indicates a high grade fever, i.e., above 102° F.

Cholesteric liquid crystals are preferred since such cholesteric liquid crystals are non-toxic and readily passed through the body if accidentally ingested by the pacifier user. Example of a cholesteric liquid crystal exhibiting a color change display at 100° F. is a thoroughly blended mixture of 75% cholesteryl chloride and 25% cholesteryl oleate. An example of a cholesteric liquid crystal exhibiting a color change display at 102° F. is a thoroughly blended mixture of 78% cholesteryl chloride and 22% cholesteryl oleate.

The temperature and pressure sensitive (heat and pressure responsive) pacifier assembly 10 of the present invention is facilely prepared from a pre-formed pacifier by placing the nipple portion 12 of the pacifier in a vertically-disposed downward position. The inset member 24 is introduced into the chamber 20 via the orifice 22 and the plug 36 is disposed in the orifice 22 and affixed to inner wall of the guard portion 14 of the nipple assembly 10, such as by an adhesive, to seal the chamber 20, preferably in an air-tight manner.

EXAMPLE OF THE INVENTION

The following example is illustrative of conditions for the process of the invention and it is to be understood that the scope of the invention is not to be limited thereby.

A preformed pacifier formed of a polyvinyl chloride polymer is positioned with the nipple portion 12 extending in a vertically downward position. An insert member 24 having capsules 32 and 34 formed of 40 weight percent glycerine, 50 weight percent gelatine and 10 weight percent sorbitol encapsulating liquid crystals of the following compositions is inserted via the orifice 22 into the chamber 20 by the assembly user:

|  | COMPOSITION | WEIGHT PERCENT | TEMP. (°F.) CHANGE |
|---|---|---|---|
| CAPSULE 32 | Cholesteryl chloride | 75 | 100 |
|  | Cholesteryl oleate | 25 |  |
| CAPSULE 34 | Cholesteryl chloride | 78 | 102 |
|  | Cholesteryl oleate | 22 |  |

The capsules 32 and 34 on the insert member 24 make positive pressure contact with the inner surface of end wall 18 of the nipple potion 12. The capsule 32 changes from green to black for a low grade fever (i.e. 100° F.) and the eye of capsule 34 changes color for a high grade fever (i.e. 102° F.). The flat portion of the nipple makes intimate contact with the upper part of the tongue (which is one location of thermal mass in the human body acceptable for oral temperature measurement). Such location is ideal because it allows swallowing and sucking without affecting thermal conductive contact between the tongue and the fever monitor. By virtue of thermal conductivity from the tongue through the PYC nipple to the liquid crystal eyes, a color change from green to black is effected in less than 1 minute i.e. if a fever of 10° F. is present, capsule 32 changes in less than a minute; if fever in excess of 102° F. is present, capsule 34 changes in about ½ a minute and capsule 34 in just under 1 minute.

Once the pacifier assembly 10 of the present invention changes color indicating an abnormal temperature level as a result of use by an individual, resort to a mecurial thermometer is generally contemplated as part of a user protocol of the instant invention. Once removed from the mouth of a user, the liquid crystal material will resume its initial color after a predetermined time period at ambient room temperature.

Once the monitor is used to indicate a feverish condition, it normally takes several minutes before the capsules resets i.e. the liquid crystal material which has turned black returns to green. An interesting aspect of the present invention allows for essentially an instantaneous reset by squeezing the capsules at the nipple flat.

If the ambient temperature is below 100° F. the eyes instantly return to green.

While the present invention has been described with liquid crystal displaying color change temperature level of about 100° F.±¼° F., or higher it will be understood by one skilled in the art that slight variations may be made to such color change temperature level. One skilled in the art will appreciate that the composition of the liquid crystal may be formulated to effect different color changes, e.g. green to black, or some other color changing protocol.

Generally, liquid crystal materials displaying the desired color changing protocol herein described generally are adversely affected by the elastomeric material of the pacifier and thus cannot be formulated, per se, in the elastomeric material of the pacifier assembly although some liquid crystals may exist which may be included in such a formulation. Microencapsulation of the liquid crystal materials, as distinguished from macroencapsulation as herein described, would permit formulation with the elastomeric material, particularly for molding the nipple portion of the pacifier assembly thereby providing a more efficacious process for forming such temperature responsible pacifier assemblies.

Numerous modifications and variations of the invention are possible in light of the above teachings and therefore the invention may be practiced otherwise than as particularly described.

What is claimed is:

1. A pacifier assembly, which comprises;
   a nipple portion having an end wall and defining a chamber; and
   an insert member disposed in said chamber and having at least one liquid crystal composition disposed thereon, said liquid crystal composition exhibiting a color change at temperature above about 100° F., said insert member being comprised of an intermediate portion folded between an end portion having said liquid crystal composition disposed thereon and an inserting end portion thereof for biasing said liquid crystal composition in pressure contacting relationship against said end wall of said nipple portion.
2. The pacifier assembly as defined in claim 1 wherein said liquid crystal composition is encapsulated within a capsule.

* * * * *